United States Patent [19]

Yoo

[11] Patent Number: 5,715,108
[45] Date of Patent: Feb. 3, 1998

[54] VIDEO TAPE PLAYER FOR DISPLAYING A PREVIOUSLY RECORDED VIDEO SIGNAL READ FROM A MAGNETIC TAPE DURING HIGH SPEED RECORDING OF AN EXTERNALLY SUPPLIED VIDEO SIGNAL

[75] Inventor: Hang-du Yoo, Suwon, Rep. of Korea

[73] Assignee: Samsung Electronics Co., Ltd., Kyungki-do, Rep. of Korea

[21] Appl. No.: 638,051

[22] Filed: Apr. 26, 1996

[30] Foreign Application Priority Data

Apr. 27, 1995 [KR] Rep. of Korea ............. 95-10191

[51] Int. Cl.$^6$ ..................................... G11B 15/12
[52] U.S. Cl. ........................... 360/62; 360/64; 360/61; 386/56
[58] Field of Search ............................ 360/61, 62, 64, 360/13, 77.13; 386/56, 52, 72, 68

[56] References Cited

U.S. PATENT DOCUMENTS

| 5,012,356 | 4/1991 | Kosaka ............. 386/52 X |
| 5,233,483 | 8/1993 | Uchiyama ............. 360/64 |
| 5,272,572 | 12/1993 | Bradshaw et al. ......... 386/56 X |
| 5,428,486 | 6/1995 | Nagase ............. 360/64 |
| 5,457,584 | 10/1995 | Satoh ............. 360/64 |

FOREIGN PATENT DOCUMENTS 2-206082  8/1990  Japan ............. 360/62

*Primary Examiner*—Thang V. Tran
*Assistant Examiner*—Larry T. Cullen
*Attorney, Agent, or Firm*—Sughrue, Mion, Zinn, Macpeak & Seas, PLLC

[57] ABSTRACT

A video cassette recorder (VCR) is disclosed which is capable of displaying the video being erased during a recording operation. Thus, during a recording operation the user is able to monitor the video being erased, so as to stop recording if the VCR has reached a video the user wishes to preserve. The VCR is capable to display the video being erased during a recording operation by doubling the rotational speed of the head cylinder during a recording operation. Since the rotational speed is doubled, half of the time period is used for reading and half for recording. The VCR includes a decompressing circuit to restore the video read during the double speed rotation of the head cylinder, and also includes a compressor to compressed the externally supplied video so as to record that signal at double the normal rotational speed.

9 Claims, 3 Drawing Sheets

VIDEO TAPE PLAYER FOR DISPLAYING A PREVIOUSLY RECORDED VIDEO SIGNAL READ FROM A MAGNETIC TAPE DURING HIGH SPEED RECORDING OF AN EXTERNALLY SUPPLIED VIDEO SIGNAL

BACKGROUND OF THE INVENTION

The present invention relates to a video tape player for simultaneously performing playback and recording, and particularly, to a video tape player which can nearly simultaneously perform a recording of a new video signal and a playback of an existing recorded video signal.

In a video tape player such as a conventional video cassette recorder (VCR), when a program is recorded on a tape where another program has been already recorded, a user should identify what the already-recorded program is before recording to avoid any loss of the data which should not be erased. Moreover, when various programs have been recorded on a single tape, necessary information data may be lost unless the user checks what programs are being written over.

SUMMARY OF THE INVENTION

Therefore, to solve the above-described problems, it is an object of the present invention to provide a video tape player which enables a recording and playback operation to be performed at a faster speed than a normal tape recording speed. Here, a user can identify an existing recorded video signal by displaying video signals reproduced by the video tape player.

To accomplish the above object of the present invention, there is provided a video tape player comprising:

a head cylinder; a plurality of heads which are fixedly disposed on the cylinder so that read and write operations of a video signal can be alternately performed with respect to a video tape even when the head cylinder rotates at high speed being a predetermined times a normal speed; control unit for alternately generating a high speed recording control signal and a high speed playback control signal, and generating a high speed rotation control signal during the generation of the high speed recording and playback control signals; head cylinder drive unit for rotating the head cylinder at high speed being the predetermined times in response to the high speed rotation control signal; playback unit for reproducing a video signal read out from the video tape by the heads; recording processor for processing an external video signal to be recorded on the video tape and transmitting the processed video signal to the heads; and switching unit which can transmit the video signal output from the recording processor to the heads while the video signals read by the heads are not transmitted to the heads, during the time when the high speed recording control signal is applied to the switching means, and which can transmit the video signals read by the heads to the playback unit while the video signals output from the recording processor are not transmitted to the heads, during the time when the high speed playback control signal is applied thereto.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings FIGS. 1 through 4H.

Figure 1:
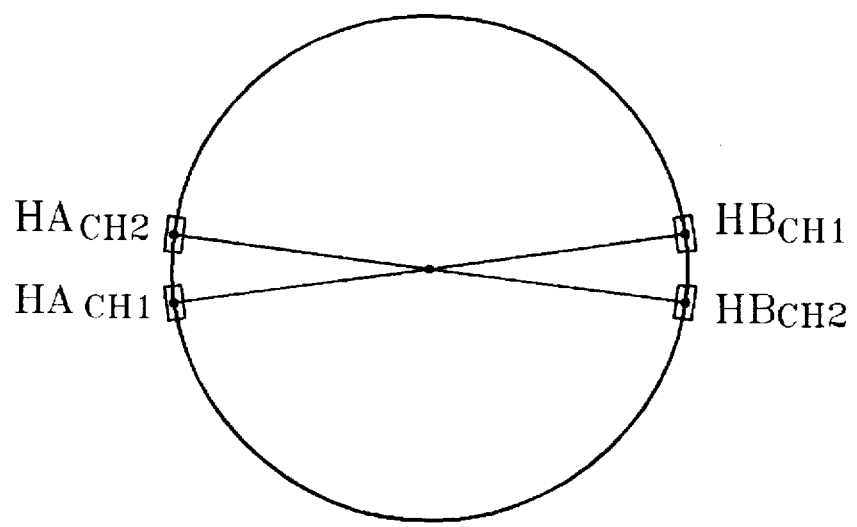
FIG. 1 is a schematic view of a general head drum.

A general video head of the video tape player employs a two-head or four-head scheme according to the number of heads which are used for recording and reproducing video signal. FIG. 1 is a schematic view of a head cylinder which has heads disposed to be adapted in the four-head scheme. A head $HA_{CH1}$ of a channel 1 is a playback head and the head $HB_{CH1}$ is a recording head. Similarly, a head $HA_{CH2}$ of a channel 2 is a playback head and the head $HB_{CH2}$ is a recording head.

Figure 2:
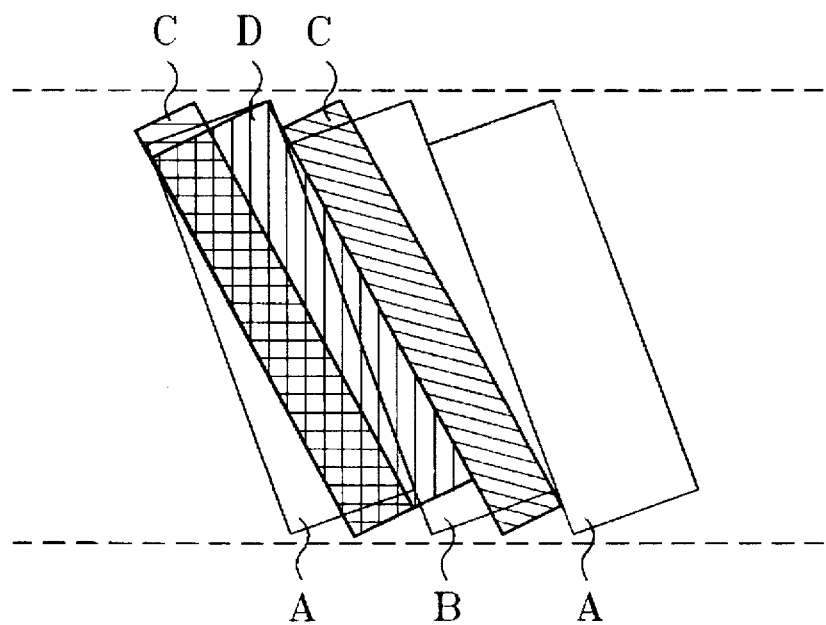
FIG. 2 shows a pattern of a video track for explaining a double speed simultaneous recording and playback according to a preferred embodiment of the present invention.

FIG. 2 shows a pattern of a video track for explaining a double speed simultaneous recording and playback according to a preferred embodiment of the present invention. Wide portions which are indicated as characters "A" and "B" represent general video tracks of the VCR. An apparatus according to the present invention to be described later with reference to FIGS. 3 through 4H, doubly increases the number of rotation of the head cylinder to reduce the normal playback time into half. Therefore, video signals can be recorded for the remaining half time. In this case, the head $HA_{CH1}$ or $HA_{CH2}$ traces over the video tracks in the form of portions "C" for playback, and the head $HB_{CH1}$ or $HB_{CH2}$ traces over the video tracks in the form of portions "D" for recording.

Figure 3:
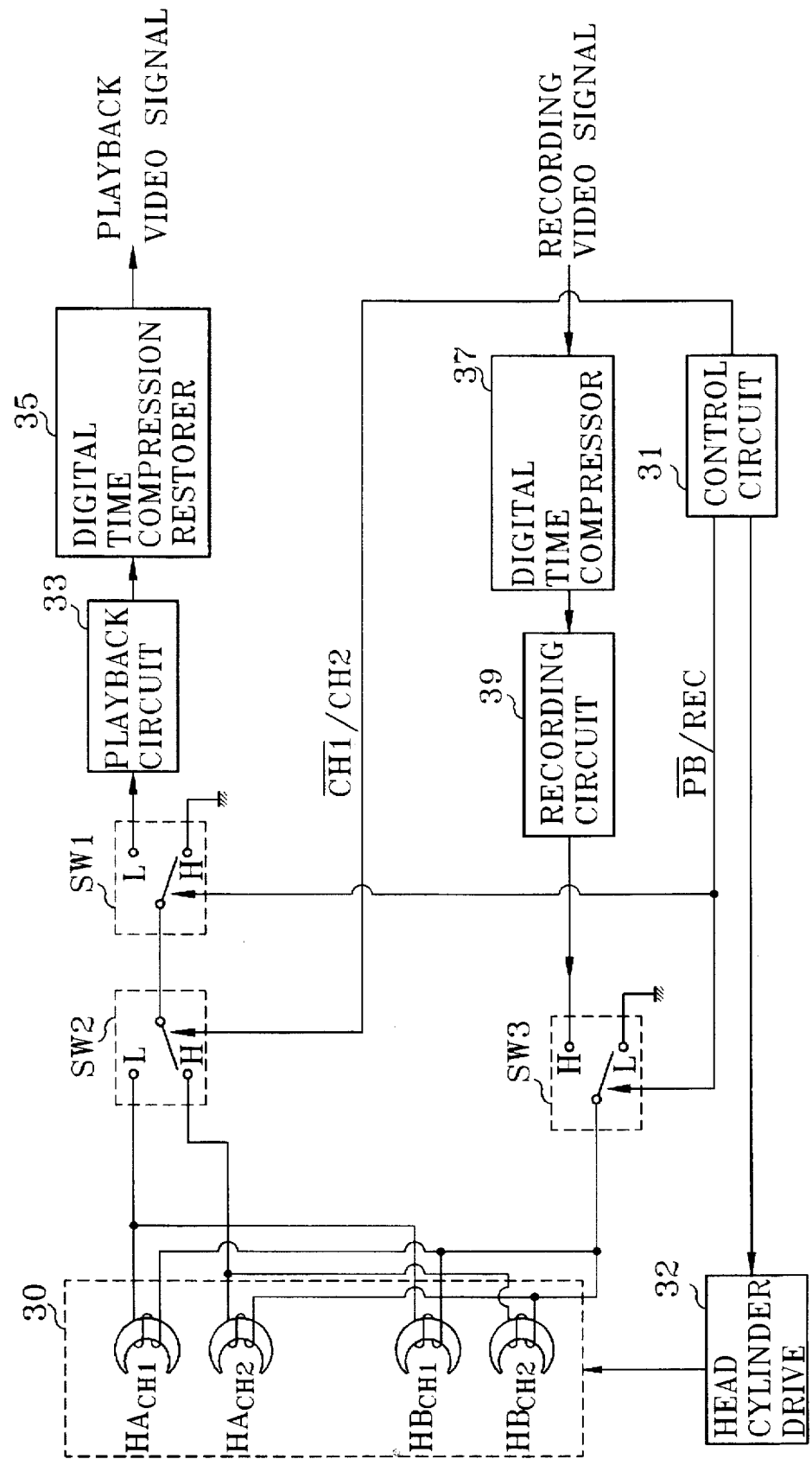
FIG. 3 is a block diagram of a video tape player which can simultaneously perform recording and playback according to a preferred embodiment of the present invention.

FIG. 3 is a block diagram of a video tape player which can simultaneously perform recording and playback according to a preferred embodiment of the present invention. The construction and operation of the FIG. 3 apparatus will be described below in more detail with reference to FIGS. 4A through 4H.

In FIG. 3, a control circuit 31 generates a channel select signal $\overline{CH1}$/CH2, a high speed playback/recording control signal $\overline{PB}$/REC and a high speed rotation control signal. As can be seen from FIGS. 4A and 4B, the high speed playback control signal $\overline{PB}$ and the high speed recording control signal REC are generated once for each during the interval of a high or low level of the channel select signal $\overline{CH1}$/CH2. The high speed playback control signal $\overline{PB}$ is generated earlier than the high speed recording control signal REC. The control circuit 31 generates the high speed rotation control signal together with the high speed playback/recording control signal $\overline{PB}$/REC. The high speed playback/recording control signal $\overline{PB}$/REC is applied to a first switch SW1 and a third switch SW3, and the channel select signal $\overline{CH1}$/CH2 is applied to a second switch SW2.

The second switch SW2 includes an input end for a video signal output from a playback head $HA_{CH1}$ of the channel 1 and an input end for a video signal output from a playback head $HA_{CH2}$ of the channel 2. The movable contact of the second switch SW2 transmits the output of the playback head $HA_{CH1}$ of the channel 1 to the first switch SW1 in response to the channel select signal $\overline{CH1}$ of the control circuit 31, while the movable contact of the second switch SW2 transmits the output of the playback head $HA_{CH2}$ of the channel 2 to the first switch SW1 in response to the channel select signal CH2 of the control circuit 31. The first switch SW1 has a movable contact which is connected to an output end connected to a playback circuit 33 in response to the high speed playback control signal $\overline{PB}$, and which is connected to another output end connected to a grounded end in response to the high speed recording control signal REC. The third switch SW3 has a movable contact which is connected to a grounded end with respect to the high speed playback control signal $\overline{PB}$ and which is connected to an output end of the recording circuit 39 with respect to the high speed recording control signal REC.

The head cylinder drive 32 rotates the head cylinder 30 according to the high speed rotation control signal generated by the control signal 31. That is, the head cylinder drive 32 rotates the head cylinder 30 at a double speed with respect to the normal speed. The four heads $HA_{CH1}$, $HB_{CH2}$, $HA_{CH1}$ and $HB_{CH2}$ disposed in the head cylinder 30 as shown in FIG. 1 perform the same functions as those described with reference to FIG. 1.

Figure 4A:
FIGS. 4A through 4H are waveform diagrams for explaining an operation of each element of the FIG. 3 apparatus.
Figure 4B:
Figure 4C:
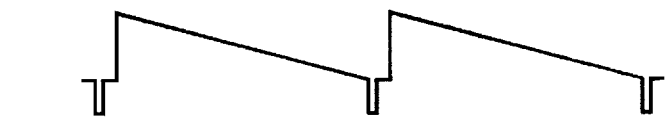
Figure 4D:
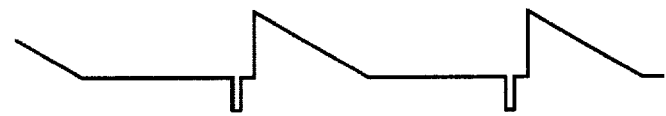

When the head cylinder 30 rotates at double speed during the generation of the channel select signal $\overline{CH1}$ of FIG. 4A and the high speed playback control signal $\overline{PB}$ of FIG. 4B, a video signal recorded on the video tape (not shown) is read out by a playback head $HA_{CH1}$ or $HA_{CH2}$, and the read video signal is input to the second switch SW2. The first switch SW1 transmits a video signal output from the second switch SW2 to the playback circuit 33 via the input end thereof according to the high speed playback control signal $\overline{PB}$. Therefore, when the playback head $HA_{CH1}$ of the channel 1 travels over the video tracks, the signal read from the video tape is transmitted to the playback circuit 33 via the second switch SW2 and the first switch SW1. However, during the time when the control circuit 31 generates the high speed playback control signal $\overline{PB}$, the moving contract of the third switch SW3 is grounded. Thus, the video signals output from the recording circuit 39 are not supplied to the heads.

Figure 4E:
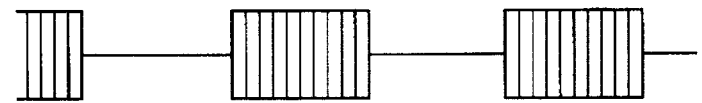
Figure 4F:
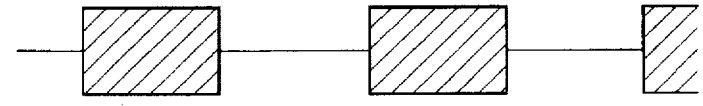
Figure 4G:
Figure 4H:

As can be seen from FIGS. 4B and 4F, the video signal output from the first switch SW1 is obtained by compressing the video signal output from the second switch SW2 into a period of the high speed playback control signal $\overline{PB}$. The video signal is demodulated and reproduced by the playback circuit 33 and is reproduced as a video signal having half of the original interval as shown in FIG. 4G. A digital time compression restorer 35 digitally time-decompresses the output of the playback circuit 33, into an original video signal having the original signal interval before being compressed, as shown in FIG. 4H.

When the head cylinder 30 rotates at double speed during the generation of the channel select signal $\overline{CH1}$ of FIG. 4A and the high speed recording control signal REC of FIG. 4B, the movable contact of the first switch SW1 is connected to the grounded end and the movable contact of the third switch SW3 is connected to an output end of the recording circuit 39. Therefore, the output (see FIG. 4E) of the recording circuit 39 is input to the third switch SW3. The video signal shown in FIG. 4E is produced by a digital time compressor 37 for digitally time-compressing the video signal (see FIG. 4C) applied from an external source and the recording circuit 39 for processing and modulating the time-compressed video signal (see FIG. 4D) in the recordable form on the video tape.

The heads $HA_{CH1}$, $HB_{CH2}$, $HA_{CH1}$ and $HB_{CH2}$ which receive the video signal output from the third switch SW3 produce a magnetic field corresponding to an electrical level of the input video signal. The particular heads which contact the video tape mechanically record the video signal magnetically on the video tape (not shown).

The output of the digital time compression restorer 35 can be regenerated via a display. Therefore, if the user manipulates the FIG. 3 apparatus while watching the video information which are regenerated via the display, the video signal can be re-recorded on the video tape intentionally.

As described above, the present invention uses the remaining time period due to the increase of the rotation speed of the heads of, the time required for the normal recording operation of the video tape player, thereby reproducing the video signal which has been already recorded even when re-recording the video signal on the video tape. Thus, since the already-recorded video signal can be displayed on the display screen, the recording operation can be interrupted in case important video information is to be kept. The user who re-records the video signal on the video tape can identify the video tape regions to be re-recorded thereon without having to inconveniently search the video tape beforehand. If the signals reproduced from or restored from the videotape are modified so as to be re-recorded thereon, the reproduced video signals can be re-recorded.

While only certain embodiments of the invention have been specifically described herein, it will apparent that numerous modifications may be made thereto without departing from the spirit and scope of the invention.

What is claimed is:

1. A video tape player capable of displaying a previously recorded video read from a magnetic tape during a high speed recording of an externally supplied video on said magnetic tape, comprising:

a head cylinder;

a plurality of heads which are fixedly disposed on said cylinder so that read and write operations of a video signal are alternately performed with respect to a video tape when said head cylinder rotates at high speed being a predetermined multiple of a normal operating speed;

control means for alternately generating a high speed recording control signal and a high speed playback control signal, and generating a high speed rotation control signal during the generation of the high speed recording and playback control signals;

head cylinder drive means for rotating said head cylinder at said high speed in response to said high speed rotation control signal;

playback means for reproducing a video signal read out from said video tape by said heads;

recording processor means for processing an external video signal to be recorded on said video tape and transmitting the processed video signal to said heads; and switching means operable to transmit the video signal output from said recording processor means to said heads while the video signals read by said heads are not transmitted by said heads, during the time when the high speed recording control signal is applied to said switching means, and operable to transmit the video signals read by said heads to said playback means while the video signals output from said recording processor means are not transmitted to said heads, during the time when said high speed playback control signal is applied thereto.

2. The video tape player according to claim 1, wherein said plurality of heads are disposed so that a width of the video track when performing a writing operation is wider than that when performing a reading operation.

3. The video tape player according to claim 1, wherein said control means performs a reading operation of the video signal on said video tape earlier than a writing operation of the video signal from said video tape.

4. The video tape player according to claim 1, wherein said playback means comprises a playback circuit for demodulating and reproducing the video signal transmitted via said switching means from said heads and a compression restorer for digitally time-decompressing the video signal of said playback circuit, and wherein said recording processor means comprises a time compressor for digitally time-compressing an external video signal and a recording circuit for processing and modulating the video signal output from said time-compressor to be recorded on said video tape.

5. The video tape player according to claim 4, wherein said time-compressor compresses the video signal at a compression rate corresponding to said predetermined multiple of normal operating speed.

6. The video tape player according to claim 1, wherein said predetermined multiple of normal operating speed is double the normal operating speed.

7. The video tape player according to claim 6, wherein said control means further generates a switching signal which is switched in level, each level having a period of two video tracks adjacent to each other, and wherein said switching means comprises a first switch for repetitively selecting the video signal read from the two adjacent video tracks and the video signal read from next two adjacent video tracks among the video signals read by said heads, a second switch for supplying the video signal output from said first switch to said playback means during the time when said high speed playback control signal is applied thereto, and a third switch for supplying the video signal output from said recording processor means to said heads during the time when said high speed recording control signal is applied thereto.

8. A video cassette recorder capable of displaying a previously recorded video read from a magnetic tape during a high speed recording of an externally supplied video on said magnetic tape, comprising:

a. a head cylinder having a plurality of heads and rotatable at a normal operating speed and at a high rotational speed;

b. a control circuit controlling said VCR;

c. a playback circuit responsive to said control circuit to receive and decompress the previously recorded video read from the magnetic tape during the high rotational speed of the head cylinder for display on a monitor;

d. a recording circuit receiving and compressing the externally supplied video for recording on said magnetic tape at the high rotational speed of the cylinder head;

e. a switching circuit responsive to said control circuit to alternatingly send the video read from the magnetic tape to the playback circuit, and send the externally supplied video to the heads, during the high rotational speed of the cylinder head.

9. The video cassette recorder of claim 8, wherein said high rotational speed is a multiple of the normal speed, and wherein during the high rotational speed of the cylinder head said switching circuit sends the video read from the magnetic tape to the playback circuit during a part of a rotational period, and sends the externally supplied video to the heads during another part of the rotational period.

* * * * *